United States Patent [19]
Clapper, Jr.

[11] Patent Number: 5,928,082
[45] Date of Patent: Jul. 27, 1999

[54] VOUCHER AND GAME TICKET COMBINATION AND APPARATUS AND METHOD USED THEREWITH

[76] Inventor: Ronald C. Clapper, Jr., 2119 Hienhill Rd., Montoursville, Pa. 17754

[21] Appl. No.: 08/927,474

[22] Filed: Sep. 11, 1997

Related U.S. Application Data

[63] Continuation-in-part of application No. 08/811,613, Mar. 5, 1997, Pat. No. 5,810,664, which is a continuation of application No. 08/500,053, Jul. 10, 1995, Pat. No. 5,609,337, which is a continuation-in-part of application No. 07/999,268, Nov. 16, 1992, Pat. No. 5,377,975, which is a continuation-in-part of application No. 07/879,747, May 6, 1992, Pat. No. 5,348,299.

[51] Int. Cl.[6] .................................. A63F 3/06; A63F 9/22
[52] U.S. Cl. .......................... 463/16; 463/17; 273/138.2; 273/139
[58] Field of Search ................................ 273/138.2, 139; 463/17, 18, 16

[56] References Cited

U.S. PATENT DOCUMENTS

| | | | |
|---|---|---|---|
| 4,817,949 | 4/1989 | Bachman | 273/139 |
| 4,953,895 | 9/1990 | Goussios | 283/102 |
| 5,007,641 | 4/1991 | Seidman | 273/139 |
| 5,290,033 | 3/1994 | Bittner et al. | 273/138.2 |
| 5,799,947 | 9/1998 | Spector | 273/304 |

*Primary Examiner*—Benjamin H. Layno
*Attorney, Agent, or Firm*—Robert J. Schaap

[57] ABSTRACT

Electronic and mechanical apparatus utilizing a voucher and game ticket combination used in the play of a sweepstakes promotional game. The voucher may represent any document, receipt, stamp, or the like which evidences an expenditure or otherwise has utilitarian value and includes a game ticket. This sweepstakes game is used as a marketing inducement to sell the voucher or coupon. Preferably, the apparatus is a dispenser which dispenses the voucher and the game ticket combination and, in so dispensing, automatically allows the play of a sweepstake game. The game ticket and the game apparatus function as an effective marketing inducement for a purchaser to acquire a particular voucher as, for example, a prepaid telephone card. In this way, the user will be able to access a telephone service. The voucher portion contains information on the use of the voucher and the game ticket portion of the voucher contains indicia relating to a play of the sweepstakes promotional game. The promotional game indicia appears on the attached game ticket and may represent a winning or scoring indicia. In addition, a bar code is present on the game ticket and as the voucher and game ticket is dispensed, the bar code is read by the apparatus and displays indicia corresponding to the sweepstakes promotional indicia on the game ticket.

17 Claims, 7 Drawing Sheets

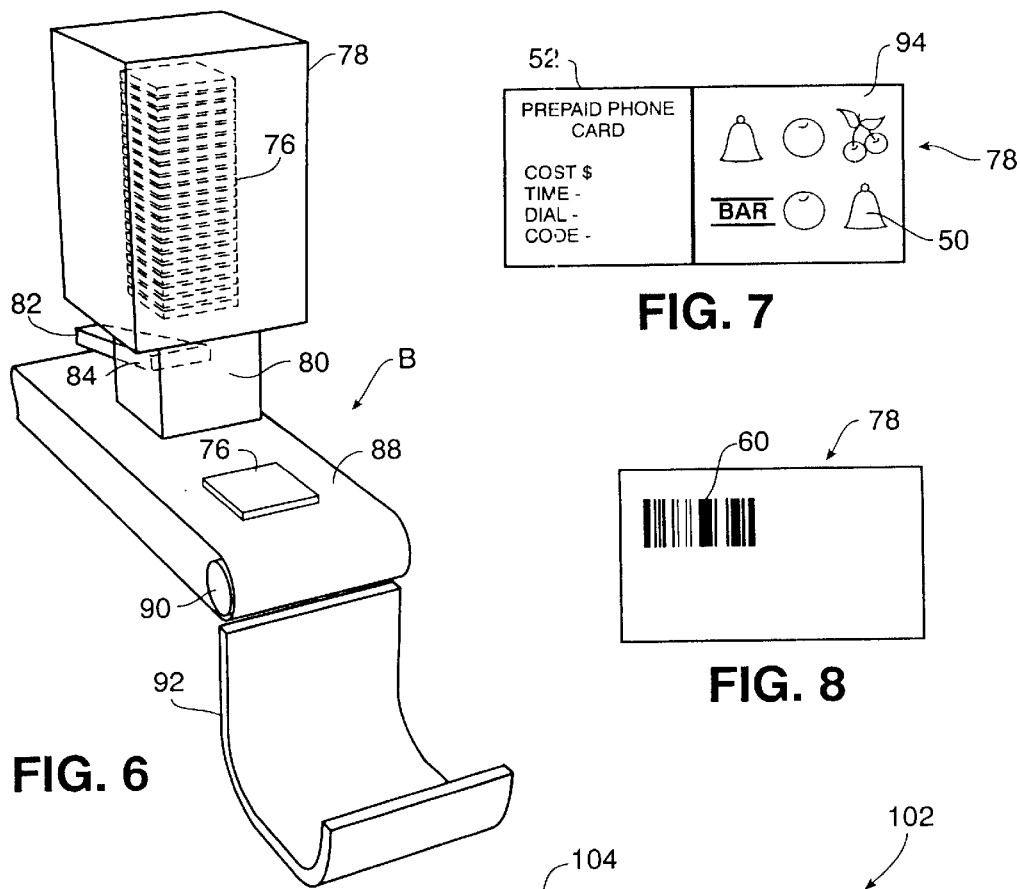
FIG. 6
FIG. 7
FIG. 8
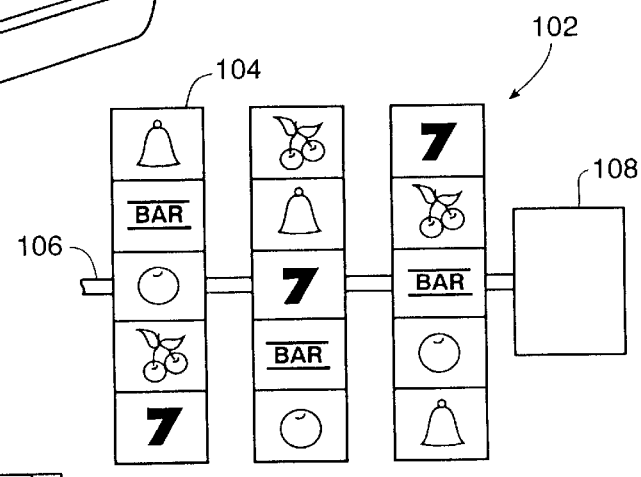
FIG. 9
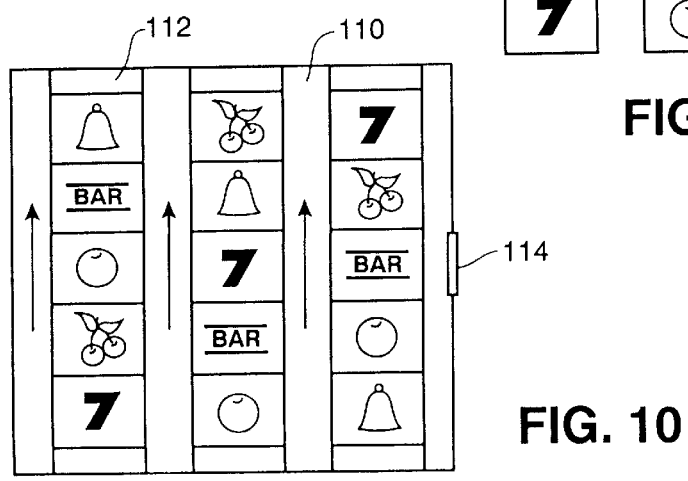
FIG. 10

VOUCHER AND GAME TICKET COMBINATION AND APPARATUS AND METHOD USED THEREWITH

RELATED APPLICATION

This application is a continuation-in-part of my U.S. patent application Ser. No. 08/811,613, filed Mar. 5, 1997, now U.S. Pat. No. 5,810,664 which is, in turn, a continuation of my U.S. patent application Ser. No. 08/500,053, filed Jul. 10, 1995 (now U.S. Pat. No. 5,609,337 dated Mar. 11, 1997) which is, in turn, a continuation-in-part of my U.S. patent application Ser. No. 999,268, filed Nov. 16, 1992 for Electronic Gaming Apparatus and Method (now U.S. Pat. No. 5,377,975, dated Jan. 3, 1995) and which is, in turn, a continuation-in-part of my U.S. patent application Ser. No. 879,747, filed May 6, 1992 (now U.S. Pat. No. 5,348,299, dated Sep. 20, 1994 for Electronic Gaming Apparatus).

BACKGROUND OF THE INVENTION

1. Field of the Invention

This invention relates in general to certain new and useful improvements in a redeemable voucher and game ticket combination and an electronic apparatus operating as a technological aid used with the game ticket portion to play the sweepstakes promotional game and which thereby serves as an inducement to acquire the voucher and, more particularly, to a voucher and game ticket combination where game ticket of the voucher allows the play of a game simultaneously with the dispensing of the voucher and where the voucher may represent an item of utilitarian value or evidence of an expenditure, including a redeemable expenditure, such as prepaid telephone card.

2. Brief Description of Related Art

In recent years, the dispensing of various types of vouchers in order to obtain a specific good or service has become quite popular. These vouchers are dispensed from a dispensing apparatus when the user inserts a selected amount of money into the apparatus, and thereby acquires a prepaid voucher. These vouchers are effective for use by the recipient at a later time since they are prepaid, and may be redeemed to obtain a specific good or service at time of need without the necessity to pay any money at that the time of actual use. Moreover, these vouchers are also effective as gift items.

One of the effective types of voucher is a redeemable voucher, that is, one in which the voucher represents a prepaid expenditure which can redeemed for a further good or service. A simple example is a telephone card or so-called "phone card" often referred to as a "prepaid phone card". These phone cards are effective in enabling a user to pay a specified amount of money in order to acquire a ticket or voucher representing that pre-payment for subsequent use to acquire telephone access, e.g. long distance access, on that telephone without payment at the time of use. The user of the telephone card can dial a toll-free access telephone number and/or other numeric code as, for example, a personal identification (PIN) number on the card in order to obtain access through conventional telephones for a selected time period, e.g. a two minute telephone call. In another form, the voucher may be a ticket or card of utilitarian value as, for example, a collectible, e.g. collectible baseball cards.

Other types of prepaid card dispensers may permit accessing of goods as, for example, a prepaid gasoline card, to obtain a selected amount of gasoline with that card. Thus, if a user of a gasoline card is using an automobile in which gasoline is needed, and that user does not have available money on his or her person at the time, the gasoline card would be highly effective. In like manner, a telephone card is highly effective where a user may need to access a pay telephone when money is not available or otherwise, may wish to use another party's telephone without incurring telephone costs for that other party. Inasmuch as there is little governmental regulation on this type of voucher dispenser, and due to a high profit potential there is a substantial amount of competition among voucher dispensers.

In order to enhance the use of a particular operator's voucher dispenser, it has been proposed in accordance with the present invention to incorporate a promotional game, such as a sweepstakes promotional game, in connection with the dispensing of a voucher, such as a prepaid phone card. Sweepstakes are commonly used as a marketing approach to enhance the sales of a product or service. As a simple example, soft drink manufacturers may offer a sweepstakes in connection with the sale of a bottle of a soft drink. The purchaser of the soft drink will examine the underside of the soft drink bottle or the bottle cap for a sweepstakes number, and submit that number to the operator in order to determine if that purchaser won the sweepstakes. However, in order to assure that it is a true sweepstakes and not an illegal lottery activity, the entire available public is entitled to acquire a bottle cap or the like, also presenting a possibility of winning the sweepstakes without purchasing the soft drink itself. This is accomplished by merely contacting the company or the producer of that soft drink or otherwise the retailer offering that product, and requesting a bottle cap or game ticket or other game piece without requirement of a paid purchase.

There have also been various electronic games of chance which are considered to be pure random chance games, e.g. those using random number generation such as slot machines. There are other types of games of chance which are not considered to be random chance games, such as those used in the aid of the game of pull tab and, consequently, they are available for use with the general public. There are also certain electronic types of games which enable the dispensing of a ticket and also generate a display of icons or other information which appear on the dispensed ticket. Representation of such games is U.S. Pat. No. 4,373,726 to Churchill et al for an Automatic Gaming System. There are other apparatus which will verify indicia on a game ticket as, for example, that system described and illustrated in U.S. Pat. No. 4,669,729 to Solitt, et al, for a Bingo Verification System.

In the present invention, each voucher will bear voucher indicia such as information on how to redeem the voucher for a selected good or service, or otherwise indicia which may have utilitarian value, such as information about an entertainment personality. The game ticket portion will contain a game indicia which allows for the play of the promotional game, as well as a machine readable code such as a bar code which is imprinted on the voucher. The code is read by the voucher dispensing game apparatus and information is generated on a display screen corresponding to that game indicia which is presented on the game ticket portion of the voucher.

OBJECTS OF THE INVENTION

It is, therefore, one of the primary objects of the present invention to provide a combination voucher identifying an expenditure or having utilitarian value and game ticket combination where the game ticket portion automatically initiates the play of a game, such as a promotional sweepstakes game, upon acquisition of the voucher ticket combination.

It is another primary object of the present invention to provide a redeemable voucher dispensing apparatus which is capable of dispensing vouchers which can be redeemed to obtain specific goods or services and which vouchers also have a game ticket which enable the play of a game such as a promotional sweepstakes game.

In another object of the present to provide voucher and game ticket combination of the type stated in which a dispensed combination of voucher and game ticket contains certain game indicia used in the play of the game and a machine readable code representative of game indicia on the game ticket portion of the voucher.

It is further object of the present invention to provide a voucher participating apparatus which operates as a technological aid in the play of the sweepstakes game and in which game indicia on the game ticket of the voucher may be initially covered and which when uncovered, will reveal whether or not the receiver of the dispensed voucher won or scored in a sweepstakes game and which will also enable a display of game indicia related to that on the game ticket.

It is also an object of the present invention to provide an electronic voucher dispensing apparatus in which a voucher is dispensed upon introduction of a selected amount of money, and which voucher will contain voucher indicia enabling the user to use the voucher, e.g. redeem the voucher, for a selected good or service and a game ticket portion having game indicia which allows the user to play a sweepstakes promotional game associated with the dispensed voucher.

It is still another object of the present invention to provide an apparatus of the type stated which allows for dispensing of a voucher and in which the voucher is a prepaid phone card allowing for the accessing of a telephone line for a predetermined time period, and which also enables the play of a promotional game, such as a sweepstakes game.

It is still a further object of the present invention to provide an electronic or mechanical apparatus of the type stated which dispenses a redeemable voucher and an attached and removable game card allowing for the play of a promotional game and which functions as a technological aid in the play of the sweepstakes game, and which thereby enhances the use of the redeemable voucher.

It is an additional object of the present invention to provide an apparatus of the type stated which is highly attractive in that the user obtains the advantage of a play of a game in addition to obtaining a prepaid voucher.

It is another salient object of the present invention to provide a voucher which contains first indicia enabling the acquisition of a specific good or service and which also contains second indicia enabling the play of a game on the technological aid apparatus, as well as a machine readable code which enables a generation of a display of certain second indicia on a game ticket portion of the dispensed voucher by the same apparatus.

It is still a further object of the present invention to provide a method of enabling the dispensing of a voucher which also enables the play of a game, such as a sweepstakes game.

It is another salient object of the present invention to provide both a method of providing a voucher and a voucher dispensing apparatus of the type stated which can be constructed at a relatively low cost, and which is highly adaptable for the playing of a number of games in connection with the enabling of the use of a redeemable prepaid voucher.

With the above and other objects in view, my invention resides in the novel features of form, construction, arrangement and combinations of parts presently described and pointed out in the claims.

BRIEF SUMMARY OF THE INVENTION

The present invention relates in a broad aspect to a combination of a voucher having a game ticket portion which allows the automatic play of a sweepstakes promotional game upon acquisition thereof. Although the ticket portion of the voucher may be severable from the voucher as hereinafter described, it may also be integral therewith. Thus, the term "voucher" will also include the voucher and game ticket combination.

As indicated previously, the voucher may adopt the form of a coupon, or a ticket, or the like which may represent a prepaid expenditure and, therefore, gives rise to evidence of an expenditure. Thus, the voucher may adopt the form of a prepaid card or ticket, such as a prepaid phone card, which allows use of a public telephone without payment at time of use. The term "voucher" is used in a broad sense to therefore encompass coupons and ticket or the like which evidence this expenditure for a ticket which represents a prepayment for a good or service, or otherwise, for an item which has utilitarian value.

Accordingly, the term "voucher" I used herein in a broad sense to encompass any type of redeemable ticket of the type stated, as well as tickets of utilitarian value, such as substrates bearing indicia of value which adopt the form of, for example, information about popular entertainment figures, athletic figures or the like. In addition, since a redeemable coupon or the like has utilitarian value, the term "utilitarian value" is also used in a broad sense to encompass vouchers having redemption value and vouchers having intrinsic value or extrinsic value to a holder.

In one aspect of the present invention, the voucher and game ticket combination may be dispensed from a dispensing apparatus upon introduction of payment into that apparatus. In another embodiment of the invention, the voucher and game ticket combination can be purchased at a specific place of purchase as, for example, from personnel who receive payment for the voucher and personally dispense same or otherwise from a separate dispensing apparatus and where the game ticket portion may be used in a separate game playing apparatus and, upon introduction of the game ticket, will automatically play a sweepstakes game.

As indicated previously, the voucher can be effective for redemption against any of a variety of goods or services which are provided on that voucher. In each case, the voucher is specific to a specific good or service for which it may be redeemed. Otherwise, the voucher may not be redeemable and may represent the actual value for which the money is paid. As a simple example, the voucher may exist in the form of a prepaid phone card and therefore is redeemable for telephone access without depositing money into a telephone.

When a user deposits a specific sum of money into a dispenser in accordance with the present invention, that user will receive a dispensed voucher. In the case where the voucher represents the item of value, such a utilitarian item, it is not redeemable. However, where the dispensed voucher represents prepayment for a later acquired good or service, it may be redeemed at a subsequent time for the good or service. Thus, and in a preferred embodiment, the voucher may represent a prepaid phone card. This will allow the user to access a telephone for a specified amount of time in accordance with the amount of money paid. Thus, as an example, the user may pay a $1.00 amount and receive a telephone card allowing access to any telephone for, e.g., a two minute time period.

The vouchers in accordance with the present invention usually contain two parts, and the first of which is that portion of the voucher allowing the voucher to be used for acquiring a specific good or a specific service as, for example, telephone access or otherwise access to a sporting event, etc. The second part of the voucher is that of the game ticket for playing a promotional game. In effect, the promotional game is available to the purchaser of the voucher without any additional cost, as, for example, in a conventional sweepstakes. In the particular case, the general public is also entitled to acquire a game ticket without the voucher at no cost in order to engage in the play of the sweepstakes game. Nevertheless, inasmuch as the user of the voucher can automatically acquire the game ticket, this combination voucher and game ticket and the automatic play of a game when dispensed is a highly effective promotional activity which is used to entice the user to acquire that particular redeemable voucher.

The present invention provides, in a broad sense, a system which includes both a dispenser and the vouchers issued by that dispenser, as well as a dispenser, per se, and as well as the vouchers, per se. Also in a broad sense, and in another embodiment, the present invention provides two separate apparatus and one of which may function as a voucher dispenser and the second of which may be remote to the first and function as a technological aid for playing the sweepstakes promotional game. Although the vouchers may have two major components, they preferably exist on a single substrate. That substrate may or may not be severable so as to allow the game ticket portion of the voucher to be separable from the voucher portion. For this purpose, the voucher may have a score line or like line allowing separation of the two portions.

Each of the vouchers will contain two types of indicia, including a first indicia, frequently referred to as "voucher indicia", and which provides information to the user as to the means for potentially redeeming that voucher. This indicia may also provide information to the redeeming party, such as a retail store outlet, as to the value of the voucher, etc. The game ticket portion of the voucher will further contain second indicia, often referred to as "game indicia", which allows the user to play a sweepstakes promotional game in accordance with the present invention.

The use of the promotional game, such as a sweepstakes game, has been found to be highly effective in enticing potential purchasers to select a particular voucher from a dispenser available in accordance with the present invention. This dispenser also operates as a technological aid in the play of the sweepstakes game, and therefore greatly enhances the interest and excitement obtained when selecting a redeemable voucher. As indicated previously, a separate dispenser may be employed which may adopt the form of a human counterpart in place of an electronic dispensing apparatus, and a second game apparatus may be used. In this case, the player may pay for a voucher at a first dispensing apparatus and take the voucher or at least the game ticket portion of that voucher to a separate game apparatus to engage in the play of the game. In the latter case, the user inserts the game ticket into the game apparatus which will automatically inform the user as to whether or not he or she has won or otherwise scored in a sweepstakes promotional game.

Each of the game tickets or the vouchers which are dispensed in accordance with the present invention will also contain a machine-readable code, that is, a code which is not readily decipherable by visual examination. Typically, this machine-readable code exists in the form of a bar code. The bar code is related to the game indicia, and as a dispenser dispenses a voucher, a reading mechanism in the dispenser, as hereinafter described. The bar code may be one which is encrypted but nevertheless cannot be read by visual examination. Nevertheless, the apparatus will automatically read the bar code and generate a display of indicia directly related to that game indicia on the dispensed voucher and thereby aid in the play of the game.

The game indicia on the game ticket of the voucher is usually covered by a removable cover strip when the voucher is initially dispensed. Thus, when the player or receiver of the voucher removes this removable cover strip, the game indicia will inform the recipient whether or not he or she won or at least scored in the sweepstakes promotional game. Although a cover strip is not necessary, it is usually desirable. Moreover, the cover strip also provides an indication as to whether or not the voucher may have been tampered with or if someone previously attempted to remove that cover strip.

In order to conform to many governmental regulations, and particularly the regulations of certain states, the game tickets bearing the game indicia may be available without any redemption value by merely requesting, usually in writing, one of these game tickets from the provider of the sweepstakes as, for example, the operator of a prepaid phone card dispenser. In this latter case, however, the party acquiring the free game ticket will obviously not receive the voucher having prepaid value for ultimate redemption of a good or service and will otherwise not receive a voucher portion having separate utilitarian value.

Vouchers in the nature of prepaid phone cards of this type are effective in emergency situations where a user does not have the availability of a portable telephone and may not have the proper amount of coins in which to use a pay telephone. Thus, prepaid phone cards are effective in enabling the player to use any conventional telephone by merely dialing a special code available on the prepaid phone card.

In one embodiment, the dispensing apparatus contains a primary strip which can be subdivided into individual segments and where each segment contains both the voucher indicia and the game indicia thereon. However, the game ticket portion of the voucher may be separable from the remaining portion of the voucher, as indicated previously. This strip of segments may be in the form of a roll containing the segments and where each segment is capable of being separated from the roll and dispensed. The voucher containing strip also comprises a duplicate or secondary strip covering the indicia such that the indicia is not viewable until the cover strip is removed.

The apparatus further comprises means for severing a segment of the primary strip, e.g., a prepaid phone card, and dispensing the same upon actuation of the apparatus. In addition, a separate means for dispensing is provided which dispenses the substrate segment or voucher.

In order to obtain a voucher from a dispenser in accordance with the invention, the user is required to deposit the necessary amount of money in order to actuate the apparatus and receive the voucher. At no additional cost and as a promotion, the user can also play the game associated therewith. For this purpose, the dispenser is provided with a money-receiving mechanism which will read the money and permit actuation of the apparatus when a proper amount has been so deposited. The money mechanism may be in the form of a conventional coin mechanism or in the form of a bill reading and accepting mechanism used with paper currency.

The dispensing apparatus of the present invention also includes a display means for displaying the game indicia which appears on the ticket, as aforesaid. Moreover, the game indicia can be in the form of a single icon or otherwise, in the form of a group of icons, or, for that matter, the game indicia may be other types of indicia. In addition, the game indicia can be displayed on a monitor in precisely the same location and arrangement as it appears on the dispensed voucher, and in this way the apparatus further serves as the technological aid.

As also indicated previously, one embodiment of the apparatus operates with pre-cut individual vouchers. In this case, the vouchers are dispensed from a hopper containing a stack of the vouchers. Again, those vouchers having winning game indicia, if any, would be randomly distributed throughout this stack of vouchers. Upon actuation of the dispensing apparatus, an individual voucher is released from the hopper containing the vouchers and moved to a conveyor where it is then deposited in a dispensing tray. In this case, the individual voucher is also preferably provided with a removable cover sheet. If the cover sheet is removed prior to use by a player, that is an indication that someone improperly or unauthorizedly examined that particular voucher or at least the game ticket portion of the voucher. Moreover, it precludes anyone from stacking the vouchers to know the location of those vouchers containing the winning or scoring game indicia.

In still another embodiment of the invention as indicated above, a first voucher dispenser may be employed which dispenses a particular voucher and game ticket combination. The voucher or the game ticket may then be taken to a second separate apparatus which is a game playing apparatus for playing the sweepstakes promotional game. The purchaser of the voucher will insert at least the game ticket portion of the voucher into that apparatus in order to play the sweepstakes promotional game. Beyond this, the two apparatus are essentially identical in operation and function.

In another aspect of the invention, an indicia control means forms part of the apparatus and is associated with the processing means for causing the displayed indicia to be moved across the display means and selectively stopped at selected positions, so that the player of the game of chance observes an image of indicia correlated to that on the dispensed voucher.

The present invention thereby provides a unique and novel voucher and game ticket combination as well as an apparatus which serves as a technological aid and, more specifically, as an electronic aid and allows for the automatic play of the game with the game ticket of that voucher and which satisfies and fulfills all of the above-identified objects and other objects which will become more fully apparent from a consideration of the forms in which the voucher and the apparatus may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 1:
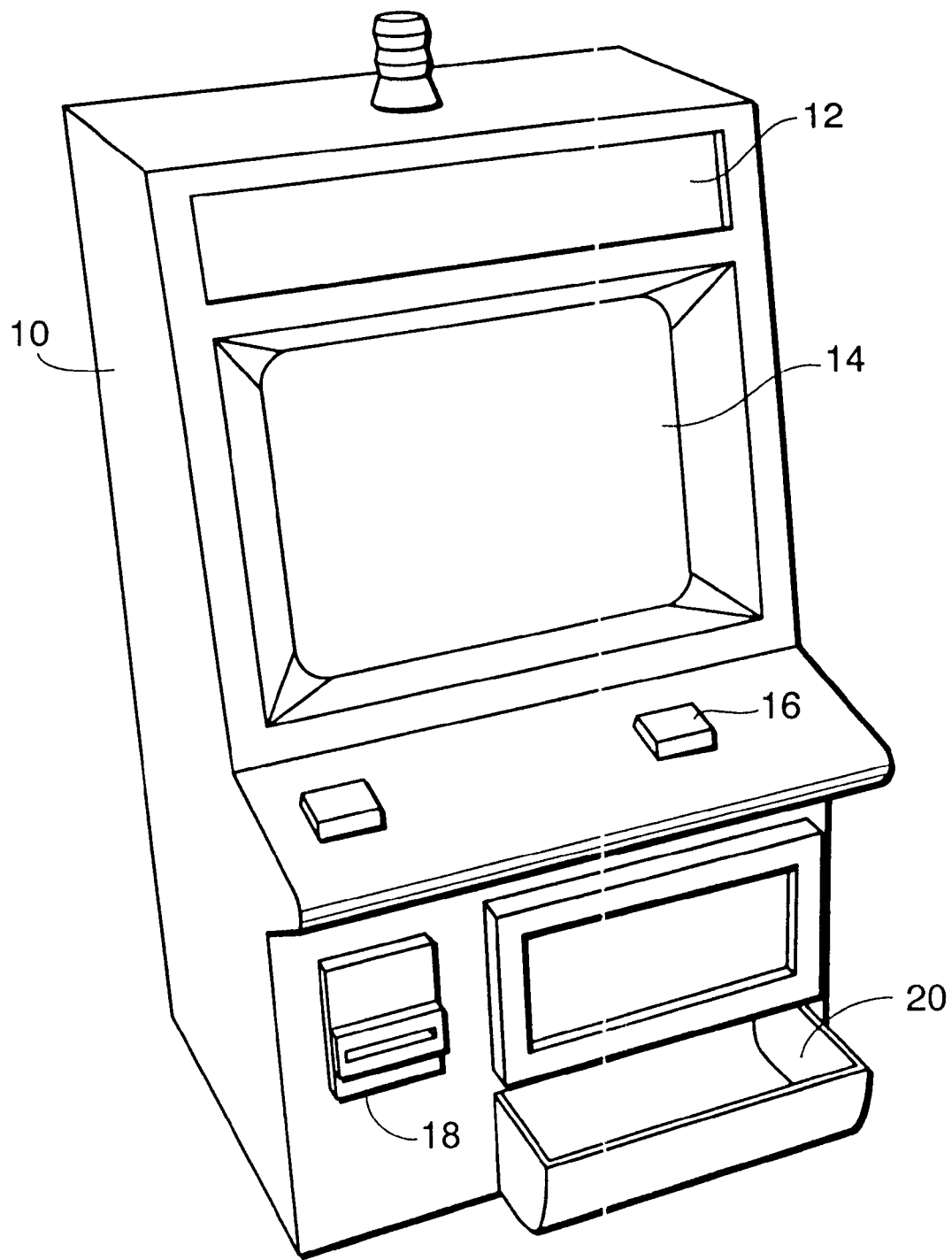
Figure 2:
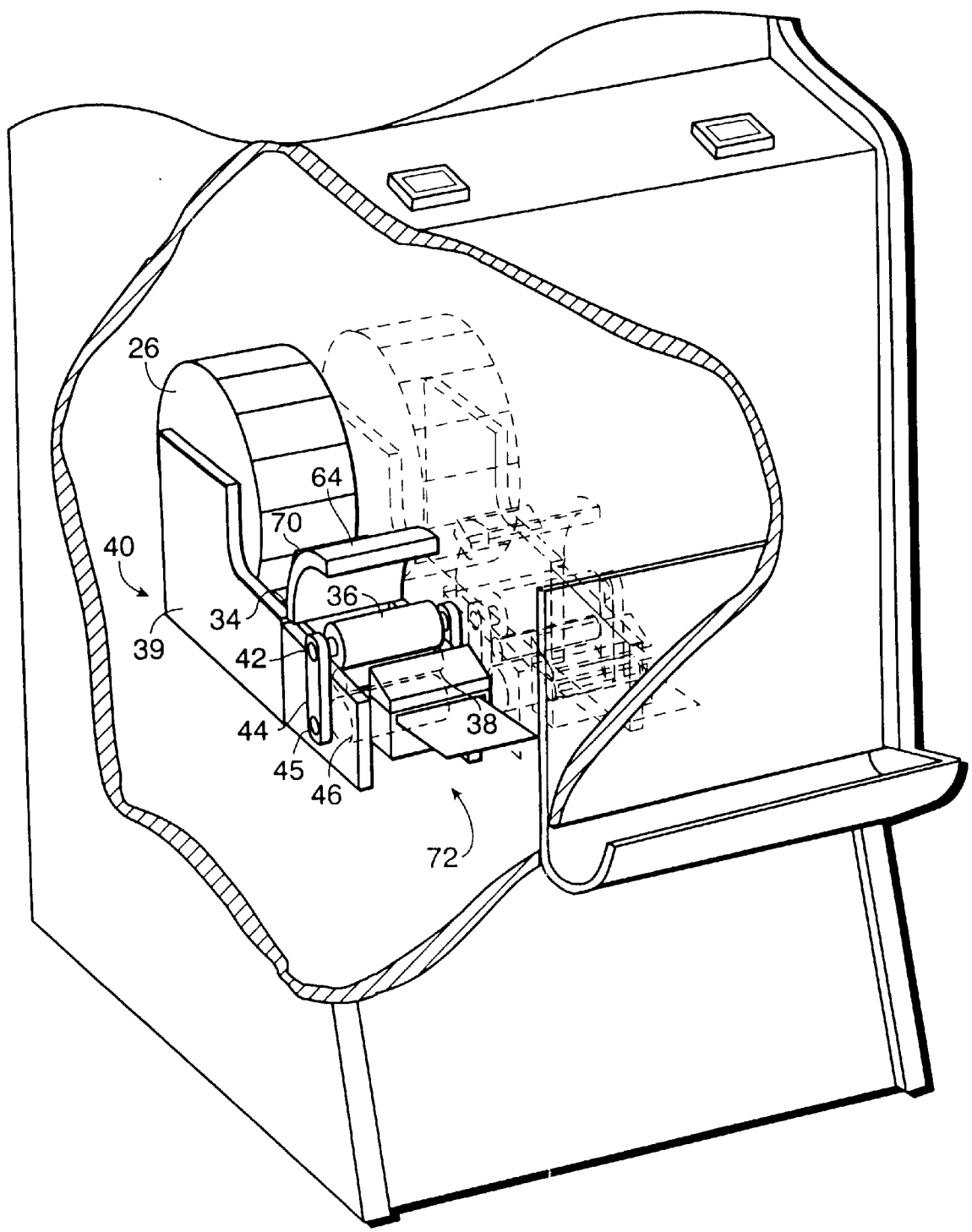
Figure 3:
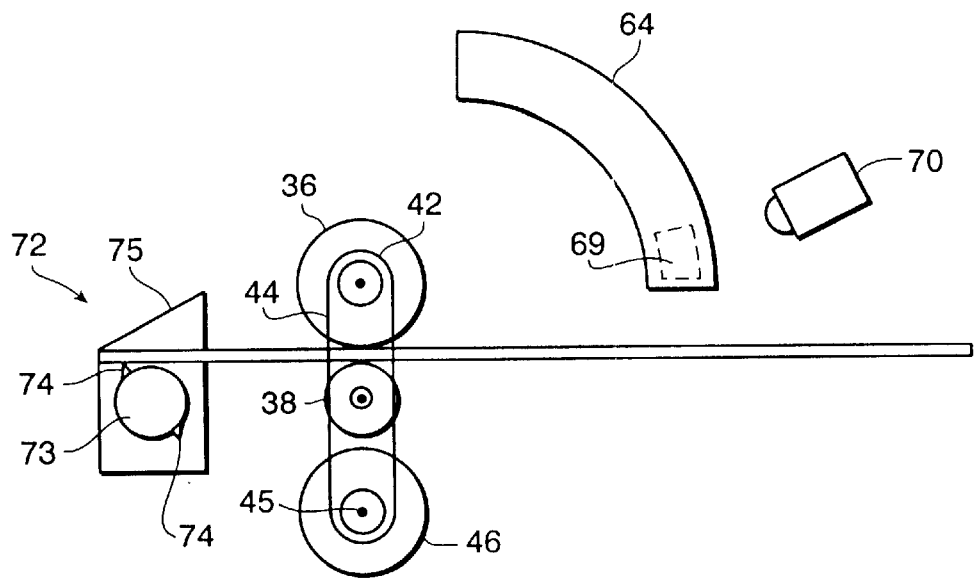
Figure 4:
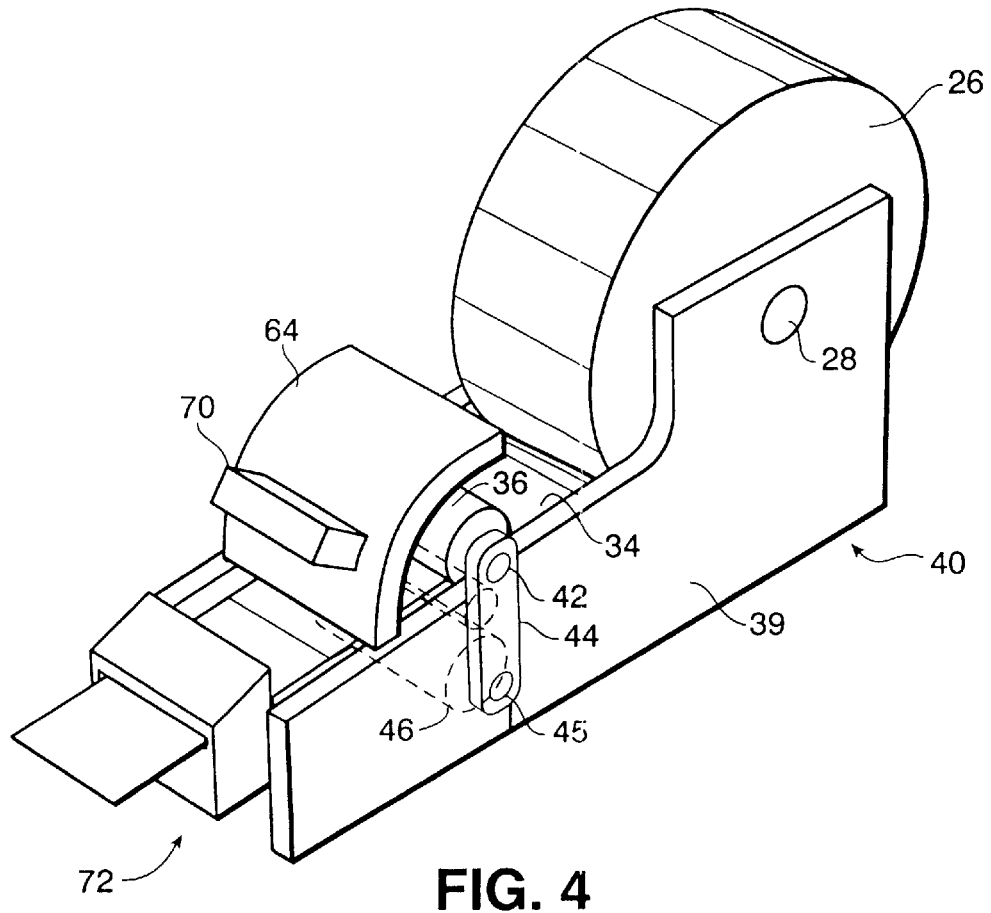
Figure 5:
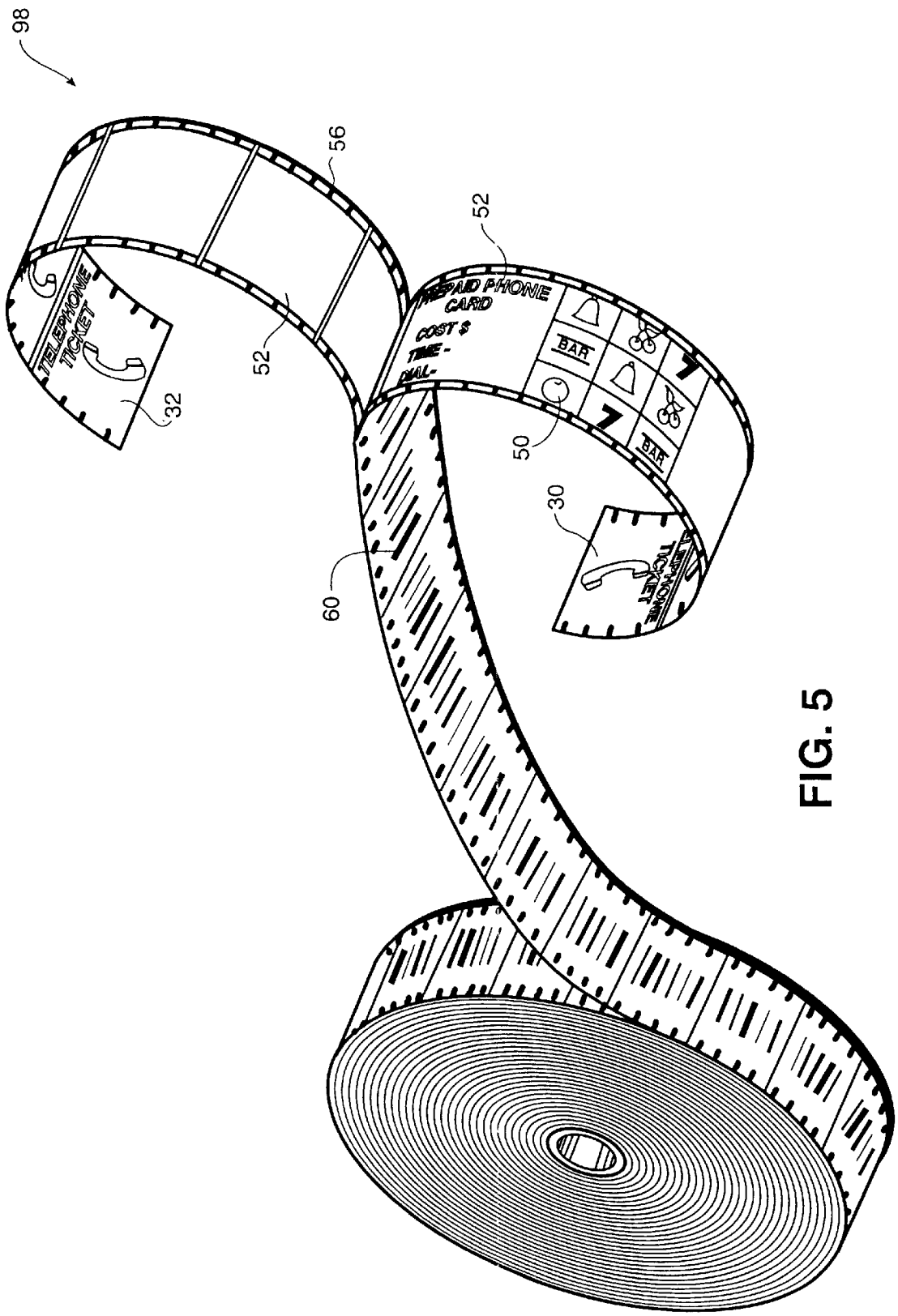
Figure 11:
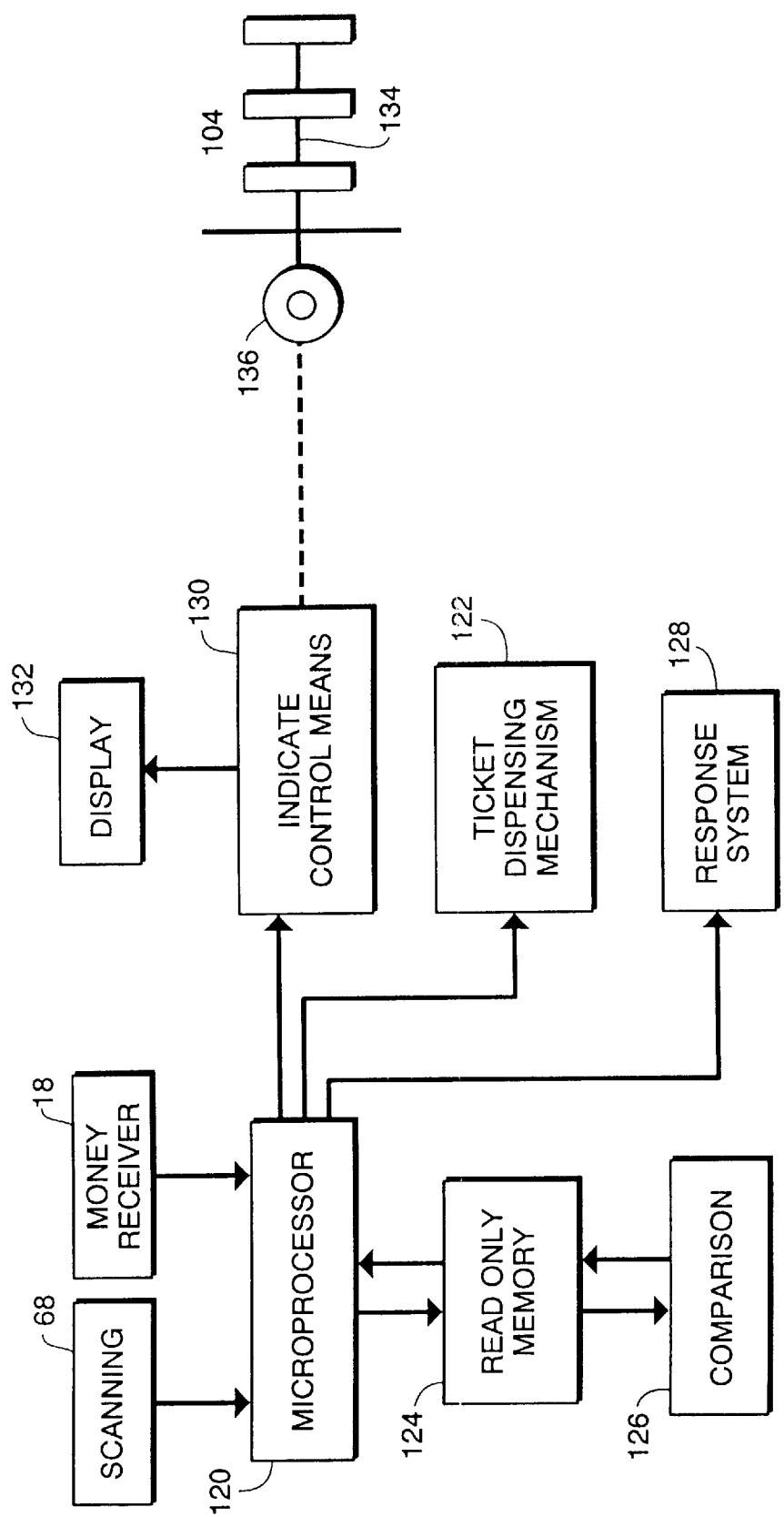
Figure 12:
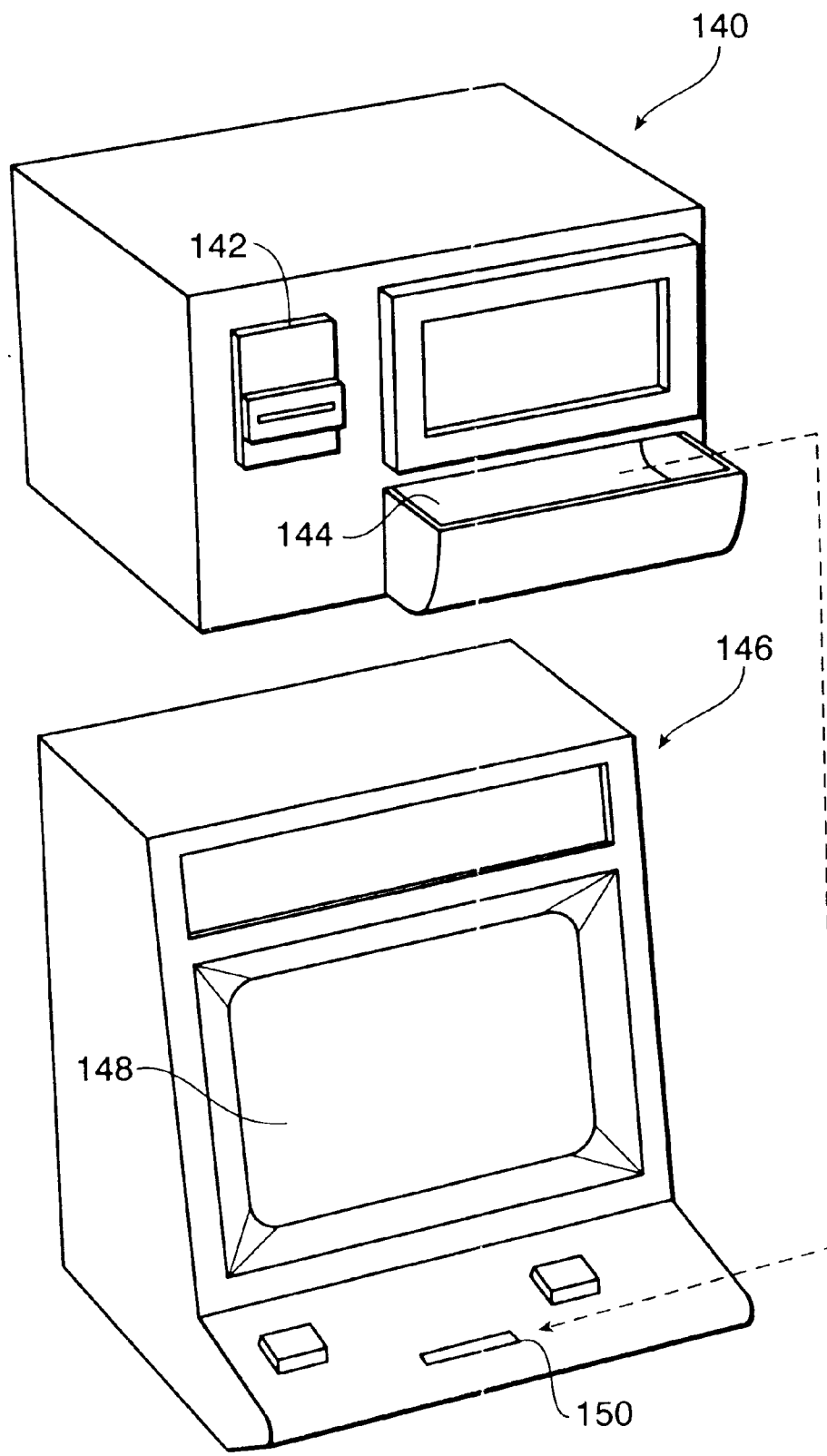

Having thus described the invention, reference will now be made to the accompanying drawings (six sheets) in which:

FIG. 1 is a perspective view of an apparatus constructed in accordance with and embodying the present invention;

FIG. 2 is a fragmentary perspective view, partially broken away and in section, and showing the major interior components forming part of the apparatus of the invention for severing and dispensing a voucher;

FIG. 3 is a schematic side elevational view showing a portion of the voucher dispensing mechanism forming part of the apparatus of the invention;

FIG. 4 is a perspective view showing a modified form of voucher dispensing mechanism;

FIG. 5 is a perspective view of the primary and juxtaposed secondary strips;

FIG. 6 is a fragmentary perspective view of a modified form of apparatus which is capable of dispensing individual vouchers from the apparatus upon actuation thereof;

FIG. 7 is a front elevational view of one form of voucher used in the apparatus of FIG. 6;

FIG. 8 is a rear elevational view of the voucher used in the apparatus of FIG. 6;

FIG. 9 is a fragmentary elevational view showing a mechanism for using spinning wheels in the display of the present invention;

FIG. 10 is a front elevational view of an apparatus in accordance with the present invention which uses a raster pattern display member;

FIG. 11 is a schematic electrical circuit forming part of the apparatus of the present invention; and FIG. 12 is a front elevational view of a modified form of system using a dispensing apparatus and a separate game playing apparatus in accordance with the present invention.

DETAILED DESCRIPTION OF PREFERRED EMBODIMENTS

Referring now in more detail and by reference characters to the drawings which illustrate practical embodiments of the present invention, A designates one embodiment of an electronic apparatus and the associated method used therewith and which operates with voucher-ticket combinations of the invention. In particular, this embodiment of the apparatus operates in a form of a dispenser which automatically dispenses tickets and simultaneously acts as an aid in the play of a sweepstakes game in connection therewith. For this purpose, the apparatus A is often referred to as a dispensing apparatus.

The dispensing apparatus A of the invention, at least for purposes of illustration and description, is a prepaid phone card dispensing apparatus. This phone card dispensing apparatus or so-called "dispenser", will issue a redeemable voucher or coupon, which may be a phone card, allowing accessing of a telephone for a predetermined time period. Moreover, that phone card will contain the game indicia as heretofore described and as hereinafter described, for allowing the play of a promotional game, such as a promotional sweepstakes game. Although the invention is described in terms of a phone card, it should be understood that the invention is by no means so limited, and is applicable to any type of redeemable voucher which also allows for the play of a promotional sweepstakes game.

The voucher dispensing apparatus and method will be illustrated and described as a prepaid phone card dispenser and method. However, it should be understood that this apparatus and method is effective for dispensing any of the combination vouchers and game cards in accordance with the present invention. This apparatus comprises an upstanding housing 10 having a front face 12 with a display screen 14 capable of generating a display of indicia, such as numbers or symbols on vouchers having voucher substrates, as hereinafter described. The first described embodiment of the invention uses a roll or an elongate strip of the vouchers which are severed therefrom. This embodiment of the apparatus A also uses a raster pattern display screen for generating the indicia thereon.

The housing 10 can also be provided with one or more manually actuable keys 16 which enable a user to actuate the apparatus, as hereinafter described. These keys, however, are not necessary in the present invention. The keys can possibly represent various functions which the user may select and operate the keys according to the denomination of prepaid phone ticket selected, or to select a game from a multiplicity thereof.

The dispensing apparatus housing 10 is also provided with a money or currency receiver 18, which may be in the form of a coin exchanger for operating the apparatus with coins or in the form of a bill or paper currency reader. When the proper amount of money is introduced into the money receiver 18 the apparatus will be actuated to enable an actuation of the push button switches 16 and dispensing of a prepaid phone ticket.

The money receiver 18 may be either coin operated or paper currency operated, as aforesaid. In either case, these receivers are conventional in construction and therefore neither illustrated nor described in any further detail herein. However, it should be understood that the money receiver 18 is connected to a microprocessor (as hereinafter described) which primarily serves to interpret the play of the sweepstakes game and effectively operates as a communication link between the player and the apparatus. Thus, and in this case, when an appropriate amount of money has been received, an initiation signal will be sent to the microprocessor and the microprocessor will initiate an actuation signal permitting the apparatus to be operated.

The housing 10 is also provided with a discharge chute 20 for dispensing of the voucher, such as the phone cards. The phone cards which are dispensed, may be of a single denomination as for example, a one dollar denomination providing, e.g., two minutes of telephone time. In this case, the user of the apparatus will pay a total sum of one dollar. Otherwise, the apparatus could be operated so as to provide tickets of different amounts of denomination, e.g., one dollar cards, three dollar cards, five dollar cards, etc., with those tickets of increasing value providing increasing amounts of telephone time.

It should be understood that the telephone cards are only one form of voucher, as aforesaid. It should also be recognized that the term "cards" as used herein does not necessarily imply that the vouchers are limited to cardboard type stock, plastic stock, or the like. In effect, the voucher, whether or not it adopts a form of a telephone card or otherwise, can be formed of any substrate material, including paper materials, paperboard materials, thin plastic materials, and the like.

By reference to FIG. 2, it can be observed that a voucher dispensing mechanism which forms part of the apparatus is more fully illustrated. In the preferred embodiment of the invention, it is only necessary to employ one complete voucher dispensing mechanism, as hereinafter described. However, it should be understood that a plurality of side-by-side separately actuable voucher dispensing mechanisms could be provided and adapted for either sequential operation or for simultaneous operation. These other voucher dispensing mechanisms would be designed to dispense vouchers of different amounts of money value and hence, different amounts of, e.g., telephone access time.

Referring again to FIG. 2, it can be observed that the major portions of the operating mechanism 24 of this apparatus are more fully illustrated. The apparatus comprises a supply spool 26 suitably mounted on a supply spool spindle 28. The supply spool 26 is provided with a primary strip 30 (see FIG. 5) in the form of a roll, and which may be dispensed from the supply spool. The primary strip 30 is formed of a substrate material which is usually a paper or thin paper-board material, but may effectively adopt any type of rollable or bendable material such as a thin plastic strip, plasticized paper strip, or the like, as aforesaid.

The front face of the primary strip is disposed in facewise engagement with a marginally registered secondary strip 32 or so-called cover strip as shown in FIGS. 3 and 5. The supply spool 26 in the preferred embodiment is not power driven, as such. Rather, a leader strip 34 of the sequentially formed tickets unwound from the roll is driven through a drive roller 36 and an idler roller 38 which are mounted on oppositely disposed face plates 39 forming part of a dispenser mechanism housing 40. The drive roller 36 is provided at one end with a sprocket 42 and is driven by means of a drive belt 44 trained around a drive sprocket 45 on a synchronous motor 46, all as best shown in FIGS. 2 and 3 of the drawings. In this way, the strip of sequential vouchers is driven through the dispenser mechanism.

It should also be understood in accordance with the present invention that the spool 26 could also be driven and cause movement of a leader strip 34 of the individually severable vouchers, such as telephone cards. In either case, and particularly in the embodiment as shown in FIGS. 2 and 3, the motor 45 would be actuated upon proper insertion of the selected amount of money and if required according to apparatus construction, actuation of any one of the manually actuable switches 16.

The microprocessor 18 is connected to the money receiver so as to initiate a proper energization or actuation signal, when the proper amount of money has been received in the apparatus. This type of construction in which a money receiver is connected to a microprocessor to initiate actuation of an apparatus is well known.

The primary strip 30 is imprinted on its front or covered face with a plurality of first indicia, such as indicia 52, referred to as "voucher indicia", which is usually preprinted information about use of the voucher, such as the prepaid phone card, as, for example, the money denominations, a telephone number to initiate, a potential security code, e.g., PIN code, or the like. This information is provided in a relatively simple form to enable a user to initiate a telephone call which may be, for example, a long distance telephone call, without depositing any money into a pay telephone station.

The front face of the primary strip 30 is also imprinted with a plurality of second indicia 50, which may be in the form of numbers, letters, graphic symbols, or the like, and is referred to herein as "game indicia". By reference to FIG. 5, it can be seen that the first indicia 52, and the second indicia 50, for each particular voucher are each located in the individual discrete locations 54 on the primary strip 30. These discrete locations, sometimes referred to as "indicia locations", actually constitute individual voucher locations, which are ultimately severed from the primary strip and constitute the prepaid phone card or other voucher which is dispensed to the player of the apparatus.

In the embodiment as illustrated, each location 54 on the primary strip 30 is separated from the next adjacent indicia location by a pair of upper and lower horizontal lines 58. In actuality, it is not necessary for these lines to be printed on the substrate itself.

As indicated previously, one of the unique facets of the prepaid phone card dispensing apparatus or other form of voucher dispensing apparatus of the present invention is the fact that it also simultaneously enables the play of a promotional game. In this particular case, the game may adopt the form of a sweepstakes game. The indicia 50, which is the "game indicia", may be simply a sweepstakes number and in accordance with the play of this particular sweepstakes game, could potentially represent a winning or scoring number. Thus, as an example, in the sweepstakes game which is played, a number may be randomly selected corresponding to each sweepstakes voucher which has been issued and the holder of that correct number will be a winner of the sweepstakes or otherwise score in the sweepstakes.

The game which may be played in accordance with the present invention, and for that matter even the sweepstakes game, may also have other types of indicia 50, as shown in FIG. 5, for example, which may be in the nature of individual letters, graphic symbols, or the like. These indicia as shown in FIG. 5 may also adopt the form of icons, as specifically shown. Thus, these icons could represent winning combinations in a sweepstakes game or otherwise they could be used in the play of other games. It should also be understood that the voucher dispensing apparatus could be adapted for a variety of games. Thus, the user could potentially play one or more individual games along with the actuation of the apparatus and during the dispensing of a prepaid phone card or other voucher.

In the embodiment of the invention, as illustrated, each strip segment or card is shown as being separated from the next adjacent strip segment on the strip by means of the black horizontal lines 58. In actuality, there may also be score lines at the location of each of these black upper and lower lines 58 which are printed on the substrate. Further, score lines are not necessarily required and do not have to exist as true perforations since the strip itself will be cut into the individual cards or substrate sections in a manner to be hereinafter described in more detail. The primary strip 30 and the juxtaposed cover strip 32 lie in facewise contact with one another where the indicia on the front surface of the primary strip are in facewise contact with the cover strip 32. In this way, when the two strips are in such facewise contact, the game indicia in each game indicia location is essentially hidden from view.

The primary strip 30 and juxtaposed cover strip 32 are passed beneath a scanner housing 64 before entry between the drive roller 36 and the idler roller 38. In this particular arrangement, the rear face, that is, the exposed face of the primary strip 30, or otherwise the exposed face of the cover strip is disposed upwardly.

The scanner housing 64 is constructed to contain a conventional scanning element 68, such as a charge-coupled diode. However, essentially any conventional scanning element may be employed. In like manner, if desired, a light source 70 could also be located in association with the scanner housing 64 for illuminating the exposed surface of the primary strip 30 or secondary strip 32. As best shown in FIG. 4, the combined facewise disposed primary strips and secondary strips are then introduced into a cutting mechanism 72, as hereinafter described in more detail.

The rear surface of either the primary strip 30 or secondary strip 32 contains a bar code in each of the discrete separate locations, as shown in FIG. 5. In this particular case, the bar code or other machine readable code is located on the exposed surface of the secondary strip. This bar code is an identical representation of the second indicia or so-called "game indicia" 50 on each individual prepaid phone ticket. In accordance with this arrangement, the rear face of the secondary strip 32, and hence the bar code 60 thereon, will be in readable position with respect to the scanner housing 64 and particularly the charge-couple diode 69. This bar code is not readily discernable or capable of being read by visual examination. However, when properly read and converted to corresponding indicia through the microprocessor 18, that bar code is converted to indicia in a form which can be displayed. Thus, either the primary strip segment or secondary strip segment constituting each voucher will have its own individual bar code 60 corresponding to the game indicia printed on the covered surface of the primary strip 30.

The relationship between the indicia and the bar code may be recorded in a storage mechanism and which storage mechanism can form part of the microprocessor or can be connected to and accessible by the microprocessor. In any event, the microprocessor, upon recognizing the bar code, will determine the proper indicia for display. Thereafter, the game indicia is displayed on the monitor 14. In this way, the user of the apparatus will receive a prepaid phone card or other voucher as hereinafter described, and will also be able to observe on the display screen 14 the second indicia 50 contained on that ticket.

The cutting mechanism 72 can possibly be a conventional cutting mechanism of the type which is capable of severing a plastic or like sheet strip into individual segments. In the preferred embodiment of the invention, the cutting mechanism comprises a roller 73 having a pair of oppositely disposed cutting blades 74 and which are curved and angularly disposed relative to the central axis of the roller 73. Each blade 73 will initiate one complete cut of a ticket from the strip and thereafter the roller 73 will rotate to be in position for the next cutting operation by the oppositely disposed blade 74. Each of the blades 74 will bear against an anvil 75.

The cutting mechanism must be electrically operable so that it can be actuated under the control of the microprocessor to sever the strip at a proper location which constitutes an upper or lower margin of each strip segment location.

Upon energization of the cutting mechanism as, for example, by a solenoid (not shown), the roller 73 will be rotated and the blade will force the leader strip 34 into contact with the underside of the anvil 75 and thereby literally severe a strip segment or card from the remaining portion of the leader strip and thereby form a dispensable voucher. Therefore, upon receipt of a proper signal initiated through the microprocessor, the cutting mechanism 72 will be operated by the solenoid and sever the primary strip 30 into the individual strip segments or tickets. However, the microprocessor could be operated to initiate a severing or cutting signal to the cutting mechanism 72 upon the reading of a complete bar code on a particular voucher, as hereinafter described. The prepaid phone cards are thereupon allowed to deposit in the discharge chute 20 where they may be picked up by the player of the apparatus.

Depending upon the particular play of the game, the game ticket portion of the phone card having the game indicia may be mailed to the offerer of the sweepstakes for purposes of claiming the prize or the winnings of that sweepstakes.

Otherwise, if the voucher is used in another form of a game, the game ticket portion of the voucher can be taken to a cashier or like individual for purposes of collecting money or other prize, if any of the game ticket portions of the vouchers carries a winning or scoring indicia thereon.

The front face of the primary strip 30 which contains the first and second indicia will actually be disposed in intimate facewise contact with the forward face of the cover strip 32. Thus, at least the second indicia, or game indicia on the primary strip will not be initially observable until the user separates the cover strip from the primary strip. The rear and exposed face of the primary strip will contain the bar code 56, as aforesaid, and this bar code is only machine readable, that is, it cannot be intelligibly read by a user or observer of the apparatus. The secondary indicia, therefore, will not be intelligible to the player or observer until the apparatus dispenses the voucher or displays the symbols corresponding to the bar code, or the user removes the cover strip from the primary strip, or both.

FIG. 4 illustrates a slightly modified form of voucher dispensing mechanism which is similar in construction and operation to the ticket dispensing mechanism illustrated in FIG. 2. In this embodiment of the invention, the only difference between the voucher dispensing mechanism of FIG. 4 is that the position of the scanner is reversed with respect to that shown in FIG. 2. In the embodiment as shown in FIG. 4, the scanner is located immediately adjacent to, but before the cutter 72 with respect to the path of movement of the vouchers. In this position, the scanner will only read the dispensed vouchers at the last possible moment before dispensing.

FIG. 6 illustrates a slightly modified form of electronic dispensing apparatus B and which is used for the dispensing of discrete, pre-cut vouchers 76, the latter of which is best illustrated in FIGS. 7 and 8 of the drawings. The apparatus B is similar in construction to the apparatus A, except that the apparatus B utilizes a hopper 78 containing the discrete vouchers 76. In this case, the hopper 78 would be provided with means for maintaining the discrete vouchers 76 in a stack such as that shown. The lower end of the hopper 78 is provided with a discharge mechanism 80 and which operates by either an electrical signal or by means of a mechanical coupling, such as the rod 82, as shown in FIG. 6. The rod 82 or otherwise an electrical signal operating in conjunction with a solenoid (not shown) would operate a discharge plate 84 in the discharge mechanism 80 to allow a discharge of a discrete voucher 76.

Each discrete voucher 76 is deposited on a conveyor belt 88 trained about drums 90 and one of which is a powered drum for rotation. The conveyor belt 88 terminates at a discharge tray 92 in which the discrete voucher 76 is dropped for collecting by a user of the dispensing apparatus.

Each of the discrete vouchers 76 is more fully illustrated in FIGS. 7 and 8, as aforesaid, and comprises a front face 94 on the primary strip 30. The front face includes the telephone indicia 52 and the game indicia 50 thereon, as shown in FIG. 7. Moreover, the indicia is covered by a removable cover 98. The removable cover 98 is designed so that once removed, it is not readily replaceable and is capable of being discarded.

The rear or exposed face 96 of the cover strip on the discrete vouchers 76 is provided with a bar code 60, as best shown in FIG. 8. It should be understood that this bar code could actually be included on the front face 94, or for that matter on the rear face of the primary cover strip, if desired. However, it has been found to be preferable to provide the bar code on the rear face of the cover strip. Furthermore, the reading mechanism in this case could be located immediately at the lower end of the discharge mechanism 80 so as to read the bar code on the discrete voucher 76.

FIG. 9 illustrates one form of display mechanism 102 of the present invention. This display mechanism 102 uses a plurality of rotating wheels 104 in which the indicia is printed on an annular peripheral face thereof, as shown. Each of these rotating wheels 104 are rotatable with respect to a shaft 106. In this case, the shaft 106 could actually constitute a plurality of concentric shafts with each disk or rotating reel 104 mounted on a separate one of the shafts. The shaft 106 or otherwise the shaft arrangement 106 is operated by a drive mechanism 108. This drive mechanism is conventional and therefore neither illustrated nor described in any detail herein.

FIG. 10 illustrates an embodiment of the invention using a raster pattern display screen 110. In this case, three rows of indicia are shown. Generally, the display will cause the various columns 112 of the indicia to rotate as, for example, in the direction as shown by the arrows in FIG. 10. In other words, the indicia are moved upwardly across the screen from the lower edge thereof to the upper edge, and in such manner as to generate an appearance of a rotating reel. Each of these columns of indicia will stop moving so that a selected row of indicia on the game ticket will be shown at the position designated as 114, usually a row midway between the upper and lower edges of the display screen 110. All three columns of indicia will have the selected second indicia within this defined row location 114.

Also in accordance with the present invention, the first or left-hand row of indicia will first start to rotate, followed by the middle column of indicia and then followed by the right-hand column of indicia. Thereafter, the first column of indicia will stop, followed shortly thereafter by the second column of indicia, and then followed shortly thereafter by the third column of indicia. This will create an illusion as though there are actually spinning wheels behind the display member.

The present invention is provided with an indicia control means which is associated with or forms part of a microprocessor used for generating the display. In this respect, the electronic switch which is involved in generating the display is quite simple. The electronics are more fully illustrated in FIG. 11. The initial determination of whether a voucher constitutes a winning or scoring voucher, whether or not it is a discrete voucher or separated from a large strip, is performed by a scanner, such as the conventional scanning element 68. This scanner 68 is capable of reading the bar code or other type of code which may be imprinted on the game ticket portion of the voucher or a secondary strip associated with the voucher, as aforesaid. For the purposes of this invention, when a code is described as being imprinted on the voucher, it will also be understood that it may as well be on the secondary strip associated with that voucher.

In any event, after the code is read by the scanner 68, the code is introduced into a microprocessor 120 which is effectively the heart of the electronic control system of the invention. This microprocessor 120 operates the voucher dispensing mechanism represented in this FIG. 11 as 122. However, it should be understood that the term "voucher dispensing mechanism" will constitute those portions of the apparatus which cause the strip to be moved and a segment severed from the strip and dispensed, if the voucher is derived from a strip of the vouchers. In like manner, the voucher dispensing mechanism may constitute that mechanism for dispensing precut individual vouchers, as previously described.

The microprocessor operates in conjunction with a read-only memory 124 which may contain the predetermined results and the actual correct winning indicia. This read-only memory 124 would operate in conjunction with a comparator 126 in order to interpret the ticket which is dispensed as a winning or scoring ticket. A response system 128 can also be caused to operate, if desired, by generating sounds or lights.

In accordance with the present invention, the bar code which exists on each voucher is read twice. In this way, the microprocessor forming part of the dispensing apparatus will determine whether or not a complete bar code has been read. If a complete bar code has not been read, then the microprocessor will cause the apparatus to stop operation. Otherwise the microprocessor could take other action, such as causing the severing of a voucher in a center portion thereof so that it immediately becomes an invalid voucher. Contrariwise, if the full bar code has been read, then the microprocessor will recognize that this is a valid bar code and a complete voucher will be dispensed.

The actual reading of the bar code occurs in two separate scanning segments. In the first scan segment, the bar code is read to determine the content for generation of indicia to be displayed on the screen. In the second scan segment, the bar code is read in order to determine whether or not it is a valid bar code and a complete voucher.

The scanning occurs in a single sweep of the voucher past the scanning head. Actually, given the time for the voucher to literally move past the scanning head, numerous scan segments can take place. When two successive scan segments have been made and find a valid bar code, the voucher is then dispensed. However, if the microprocessor does not recognize a valid bar code or otherwise, if it does not recognize a full bar code, the microprocessor will cause a cessation of movement of the vouchers and the apparatus will effectively stop operating, as aforesaid. In this way, no invalid voucher will be dispensed.

The microprocessor 120 also operates an indicia control means 130 which may form part of the microprocessor 120, or it may be operated under control of the microprocessor 120. The indicia control means causes a display of indicia on a display member 132 which may constitute either the spinning reels or the display screen. In this case, the display member 132 represents a raster pattern display screen. The indicia control means 130 will cause the monitor, such as the display screen 132, to generate images, such as the icons or other indicia, scrolling across the display screen, much in the same manner as they appear on spinning reels or disks. Again, this indicia control means will cause the display to generate this pattern under the control of the microprocessor 124.

FIG. 11 also alternatively illustrates the operation of a plurality of individual disks or wheels, such as those disks 104. However, each of the individual disks are mounted on a shaft assembly 134 which is under the control of one or more synchronous electric motors 136. Again, the connection of the shaft assembly 134 to the synchronous motor or motors 136 is only schematically illustrated, inasmuch as the exact construction is conventional and is therefore neither illustrated nor described in any further detail herein. Nevertheless, the synchronous motor or motors 136 would cause the reels or disks to rotate, much in the same manner as the wheels or disks would rotate in a conventional slot machine gaming apparatus.

It should be understood in connection with the present invention that it is not necessary to duplicate on the monitor of the apparatus, those icons or other indicia which appear on the face of the voucher after the cover strip is removed. Thus, other information in some way related to the gaming indicia could be displayed. As a simple example, the word "winner" or other information could be presented on the screen of the monitor.

The voucher dispensing apparatus and method of the present invention are highly effective, as aforesaid. In this case, the player removes the opaque cover sheet on the game ticket portion of the voucher so that he or she can examine the indicia to thereby determine if that player was or was not a winner. No player, or any other party operating the machine or anyone else, for that matter, will know what game indicia is contained on the voucher dispensed to the player until that indicia is either displayed or read from the voucher, or both.

FIG. 12 illustrates a modified form of apparatus and dispenser combination. In this case, FIG. 12 shows a separate dispenser 140 having a money mechanism 142 and a dispensing chute 144 which receives a dispensed voucher. In this case, the dispensing portion of this dispenser 140 is essentially the same as that used in the previously described embodiment of the apparatus.

A separate apparatus 146 operating as a technological aid to the play of a sweepstakes game is also provided and includes a display screen 148 similar to the screen 14 previously described. In this case, a game ticket insertion slot 150 is provided in the game apparatus 146 and is designed to receive a ticket dispensed from the separate dispenser 140. Beyond this, the two components operate in a manner similar to that previously described. Thus, the player will take the dispensed voucher, which may be in the nature of a prepaid phone card, and use the game ticket portion thereof for play of the game in the game apparatus 146.

Thus, there has been illustrated and described a unique and novel voucher and ticket combination as well as an apparatus and a method of use therefor which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A voucher dispensing apparatus capable of dispensing a redeemable voucher enabling redemption of the voucher for a good or service having a value related to a face value of the voucher and having a game ticket portion also allowing f or the play of a promotional sweepstakes game using indicia pre-printed on the game ticket portion of the voucher upon actuation of the apparatus, said apparatus comprising;

a) a means for dispensing a voucher from a group thereof upon actuation of the apparatus and which voucher has a voucher portion having redemption value or otherwise a utilitarian value to a holder thereof;

b) reading means for reading a machine readable code on the game ticket portion of the voucher related to the indicia on the voucher during the dispensing thereof and which code is related to the play of the game;

c) processing means operatively connected to the reading means to decipher the machine readable code and enable generation and display of indicia related to that on the voucher; and d) display means on said apparatus connected to the reading means and processing means for displaying the generated indicia related to that on the dispensed voucher.

2. The voucher dispensing apparatus of claim 1 further characterized in that indicia control means is associated with the processing means and the display means for causing the generated and displayed indicia to be moved across the display means and selectively stopped at selected positions so that the player of the game observes an image of indicia correlated to that on the voucher.

3. The voucher dispensing apparatus of claim 2 further characterized in that the display means comprises a raster pattern screen and the image is that of rotating wheels simulated on the screen.

4. The voucher dispensing apparatus of claim 3 further characterized in that indicia control means causes each of the indicia to be moved vertically across the display means and selectively and successively stopped at fixed horizontal rows on the display means.

5. The voucher dispensing apparatus of claim 4 further characterized in that the means for dispensing a voucher comprises severing the voucher from a strip of the vouchers and where all vouchers in the group are contained on the strip.

6. The voucher dispensing apparatus of claim 1 further characterized in that the means for dispensing a voucher removes a voucher from a group of pre-cut vouchers and dispenses same.

7. The voucher dispensing apparatus of claim 1 further characterized in that the code is a bar code which is only machine readable.

8. The voucher dispensing apparatus of claim 1 further characterized in that the means associated with the display means for causing generation of the indicia comprises a bar code reading means which reads the code on the voucher and the processing means which operates in conjunction therewith to re-create in the display means certain of the indicia appearing on the voucher.

9. A prepaid phone card dispensing system for dispensing a phone card to enable accessing of a pay telephone for a period of time and also enabling the play of a game, said system comprising:

a) a phone card dispensing apparatus for dispensing a card from a large group of cards upon actuation of the apparatus;

b) a card having a substrate dispensed from said apparatus;

c) a first indicia on said card substrate relating to the use of the card to access a pay telephone for a preselected period of time;

d) second indicia on said card substrate relating to the play of the game and which indicia determines whether a recipient of the card wins or scores in the game;

e) a machine readable code on said card related to the second indicia; and f) reading means on said apparatus for reading the machine readable code and enabling generation of a display of indicia related to that second indicia on the card.

10. The phone card dispensing system of claim 9 further characterized in that said dispensing apparatus comprises a display means operatively connected to said reading means for displaying indicia related to the second indicia.

11. The phone card dispensing system of claim 10 further characterized in that the displayed indicia is substantially the same as that second indicia appearing on the card.

12. A method of obtaining a voucher which can be redeemed for a good or service having a value related to a face value on the voucher or which has utilitarian value and which also allows for electronically playing a promotional game and which voucher contains game indicia and voucher indicia thereon, said method comprising:

a) actuating an apparatus containing the vouchers;

b) dispensing a voucher containing the game indicia and voucher indicia from a plurality of such vouchers;

c) determining if the game indicia was a winning or scoring game indicia in a play of the promotional game; and d) causing information related to the game indicia to be generated on a display screen associated with the apparatus.

13. The method of claim 12 further characterized in that the step of causing the information related to the game indicia to be generated causes a re-creation of the game indicia on a display screen.

14. The method of claim 12 further characterized in that the method comprises also using the voucher to access a telephone without depositing money into the telephone.

15. The method of claim 12 further characterized in that the method comprises removing a cover strip over certain of the game indicia on each voucher to enable observation of the game indicia on that voucher.

16. The method of claim 12 further characterized in that the method comprises dispensing each of the vouchers in a group by severing from a roll and depositing the voucher in a chute.

17. The method of claim 12 further characterized in that the method comprises dispensing the voucher in each group of vouchers from a stack of pre-cut vouchers.

* * * * *